United States Patent Office 2,873,602
Patented Feb. 17, 1959

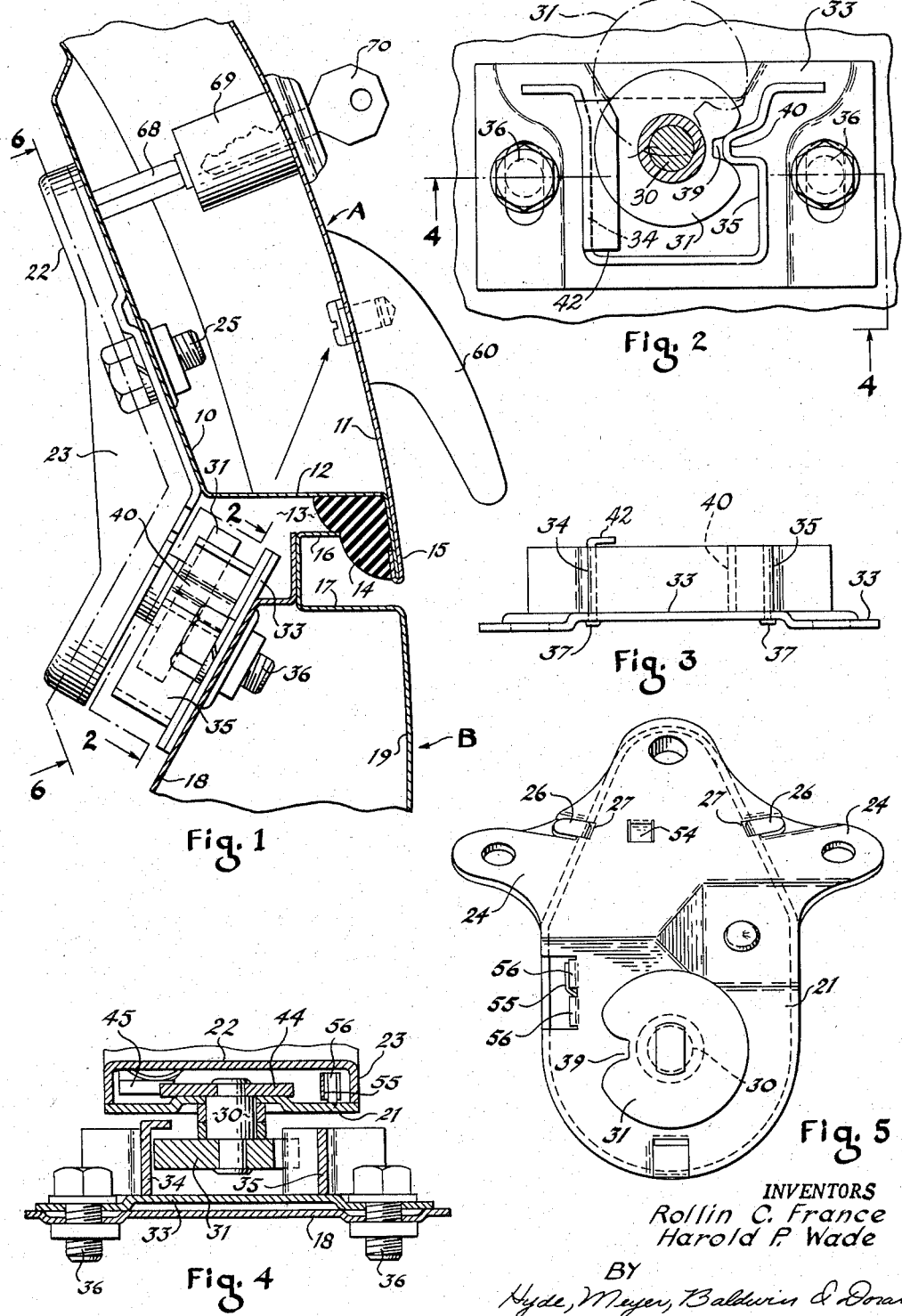

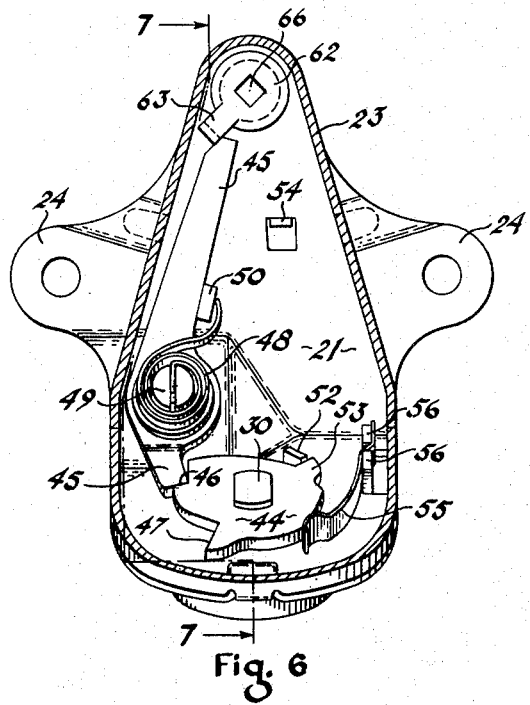
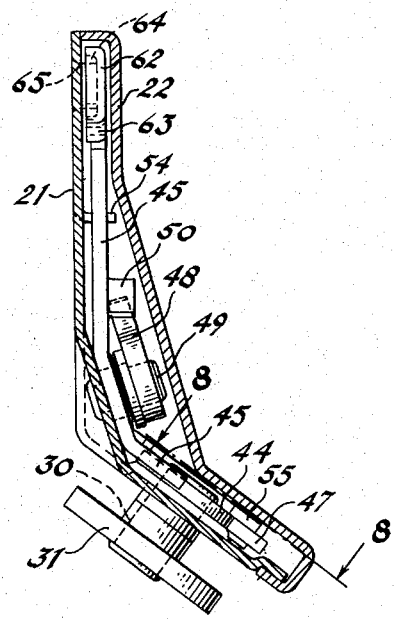
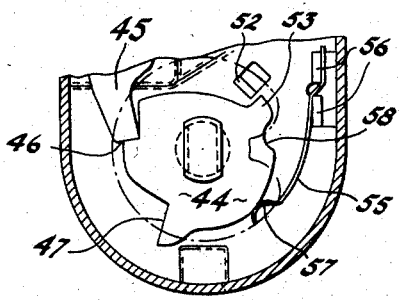
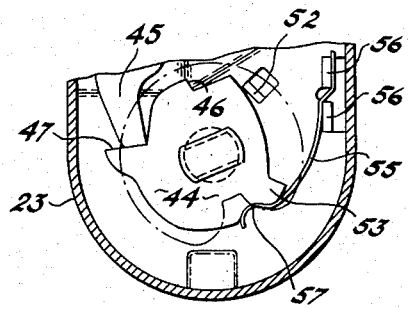
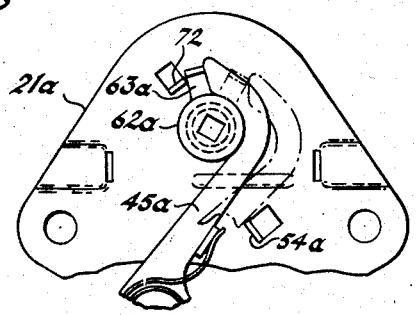

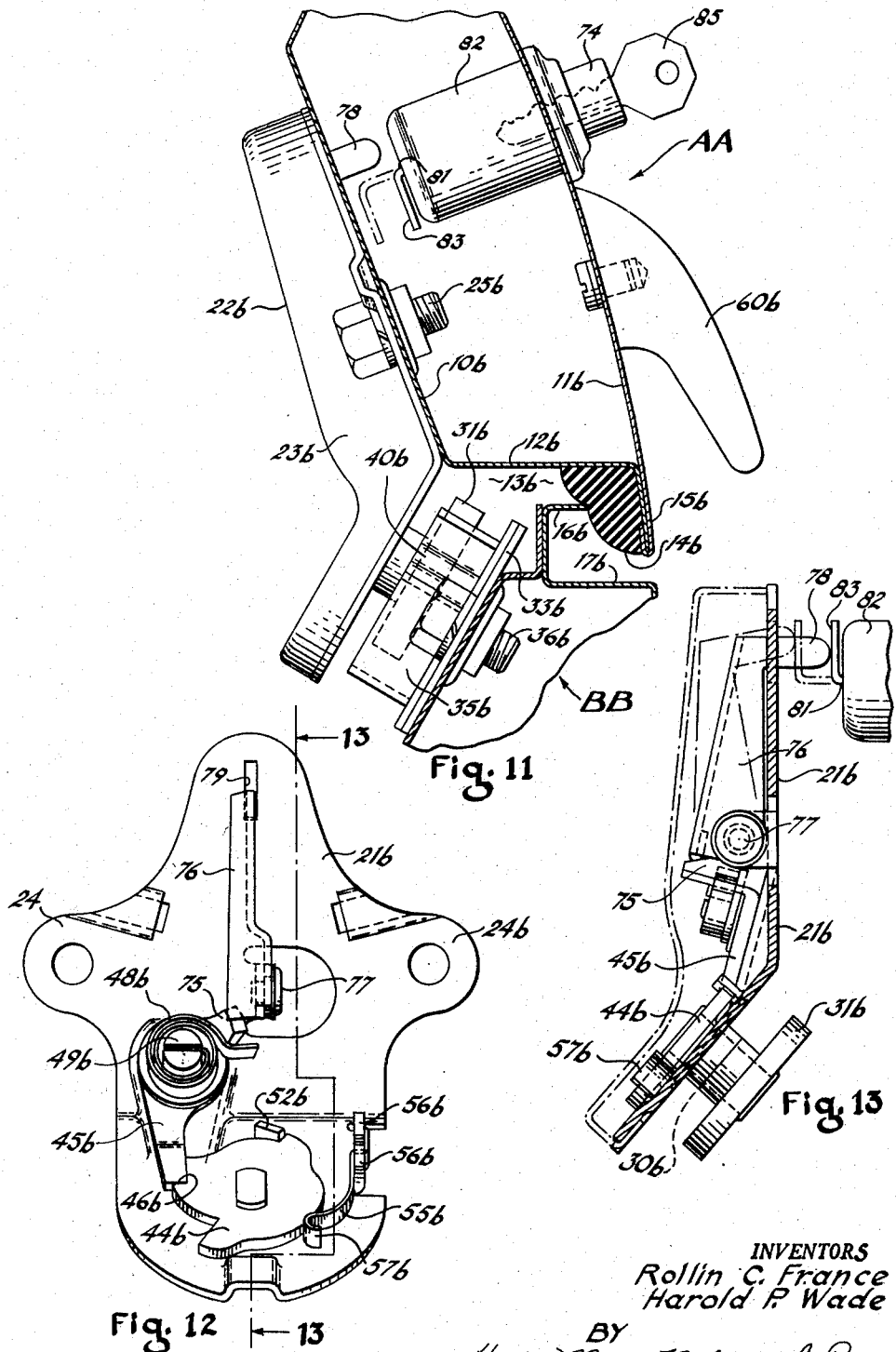

2,873,602

LOCK STRUCTURE FOR A VEHICLE DECK LID OR THE LIKE

Rollin C. France, Cleveland, and Harold P. Wade, Rocky River, Ohio, assignors to The Standard Products Company, Cleveland, Ohio, a corporation of Ohio Application June 11, 1952, Serial No. 292,826

3 Claims. (Cl. 70—139)

This invention relates to locks and more particularly, to locks which are especially suitable for the deck lids or luggage compartment covers of automobiles.

The invention has for its primary object the provision of locks of the aforesaid nature which are characterized by their structural simplicity, the economy of their manufacture, the ease of assembly of their parts, their strong and sturdy character, and their general operating efficiency.

Further and more specific objects of the present invention will be referred to in or will be evident from the following description of three embodiments of the invention, as illustrated in the accompanying drawings, in which—

Fig. 1 is a side elevational view of a lock constructed in accordance with one embodiment of the invention, as used for the releasable locking of a deck lid or luggage compartment cover in closed position;

Fig. 2 is a detail vertical sectional view, on the line 2—2 of Fig. 1, and showing the locking member of the lock of Fig. 1 in locking relationship with its striker or keeper;

Fig. 3 is a bottom elevational view of said striker or keeper;

Fig. 4 is a transverse sectional view of said locking member and its cooperating striker or keeper in the locking relationship of Fig. 2, the view being on the line 4—4 of Fig. 2;

Fig. 5 is a front elevational view of the lock of Fig. 1, with the striker or keeper and the key-controlled lock actuating means being omitted;

Fig. 6 is a vertical sectional view of the lock parts of Fig. 5, as viewed from inside the lock casing or housing, the view being on the line 6—6 of Fig. 1;

Fig. 7 is a longitudinal sectional view of the lock parts of Fig. 6, the view being on the line 7—7 of Fig. 6;

Fig. 8 is a detail elevational view of the lower lock parts of Figs. 6 and 7, the view being on the line 8—8 of Fig. 7 and showing the position of the detent-engaging member when the locking member is in its locking position;

Fig. 9 is a view similar to Fig. 8 and showing the position of the detent-engaging member when the locking member is in its non-locking position;

Fig. 10 is an elevational view of the upper portion of a lock generally like that of Figs. 1 to 9 inclusive, but differing therefrom in that it has a slightly modified form of detent lever;

Fig. 11 is a view corresponding to Fig. 1 but showing a lock with a modified form of key-controlled lock-actuating means;

Fig. 12 is a view corresponding to Fig. 6 but showing the lock of Fig. 11; and

Fig. 13 is a vertical sectional view of the lock parts of Fig. 12, as viewed from the line 13—13 of Fig. 12.

Before the locks here illustrated for the disclosure of three embodiments of the present invention are specifically described, it is to be understood that the invention is not limited to the particular details of construction or the particular arrangements of parts here shown, as locks embodying the invention may take various other forms. It also is to be understood that the terminology or phraseology herein used is for purposes of description and not of limitation, as the scope of the present invention is denoted by the appendant claims.

Although locks embodying the present invention may be used for the releasable locking of various closure structures, such locks are particularly useful, as will hereinafter appear, for the deck lids or luggage compartment covers of automobiles. Therefore, for purposes of illustration and in no limiting sense, three embodiments of the present invention, as so used, are here illustrated and described.

As shown in Figs. 1 and 11, the deck lids or luggage compartment covers A and AA with which are used the present embodiments of the invention are of the type which include spaced inner and outer sheet metal walls, numbered 10 and 11 in Fig. 1 and 10b and 11b in Fig. 11, and a sheet metal bottom edge wall, numbered 12 in Fig. 1 and 12b in Fig. 11. As is usual, the deck lids or luggage compartment covers A and AA are hingedly mounted at their upper edges (not shown) for swinging movement about generally horizontal axes to thereby enable the luggage compartment openings, numbered 13 in Fig. 1 and 13b in Fig. 11, to be opened and closed, as desired. For sealing purposes, conventional rubber strips, numbered 14 in Fig. 1 and 14b in Fig. 11, are secured to marginal flanges, numbered 15 in Fig. 1 and 15b in Fig. 11, of the deck lids or luggage compartment covers A and AA for sealing engagement with projecting parts, numbered 16 in Fig. 1 and 16b in Fig. 11, of the automobile body structures B and BB, the parts 16 and 16b being carried by body edge walls, numbered 17 in Fig. 1 and 17b in Fig. 11, which connect the spaced inner and outer sheet metal body walls, numbered 18 and 19 in Fig. 1 and 18b and 19b in Fig. 11.

Referring now to the lock of Figs. 1 to 9, inclusive, which constitutes the first of the three here illustrated embodiments of the present invention, said lock comprises a relatively thin sheet metal casing or housing having an upper section for securement to the inner wall 10 of the deck lid or luggage compartment cover A and an inwardly and downwardly extending lower section projecting below said wall, the angular disposition of said lower section being such that it is generally parallel with the inner wall 18 of the automobile body structure B, as shown in Fig. 1.

As here shown, the casing or housing comprises a sheet metal base member 21 of plate-like form, and a sheet metal cover member 22 having a right angular peripheral flange 23 for abutting engagement with the base member and which thus determines the depth of the chamber of the casing or housing. For the securement of the casing or housing to the inner wall 10 of the deck lid or luggage compartment cover A, the upper portion of the base member 21 is here provided, integrally as shown, with two oppositely extending side wall lugs 24 (Figs. 5 and 6) which are suitably apertured for the reception of bolts 25 or equivalent fastening elements. For the securement of the cover member 22 of the casing or housing to the base member 21 thereof, the peripheral flange 23 of said cover member is here provided with tabs 26 and the base member with tab-receiving slots 27, the tabs being inserted into said slots and the projecting portions of the tabs being then bent over against the base member, as best shown in Fig. 5, for the rigid connection of the two casing or housing members.

Rigidly mounted on the outer end of a stub shaft 30 having its intermediate portion suitably journalled in the angularly disposed lower section of the casing or housing base member 21 is al locking member 31 of disc-like form and which is oscillatable about the axis of said shaft between a locking position, Figs. 6 and 8, and a non-locking position, Fig. 9, as will hereinafter appear. As best shown in Fig. 1, the locking member 31 is disposed between, and in generall parallel relation with, the angularly disposed lower section of the casing or housing and the inner wall 18 of the automobile body structure B when the deck lid or luggage compartment cover is in its lowered position.

A suitable striker or keeper, for locking cooperation with the locking member 31 is rigidly mounted on the inclined inner wall 18 of the automobile body structure B. As here shown, the striker or keeper is a simple sheet metal structure having a base portion 33 and two flange portions 34 and 35 extending at right angles therefrom and laterally spaced apart for the reception therebetween of the locking member 31, as in Figs. 1, 2 and 4. For the rigid securement of the striker or keeper base portion 33 to the automobile body wall 18, said base portion is here provided with two laterally spaced apertures for the reception of bolts 36 or equivalent fastening elements—elements which also extend, of course, through suitable apertures in said automobile body wall. Although the flange portions 34 and 35 of the striker or keeper may be integral with the base portion 33, they are here shown (see Fig. 2) as the side portions of a separate channel-shaped sheet metal member of strip-like form suitably secured to said base portion, such as by the tabs 37 with which such member is here provided and which tabs extend through suitable slots in said base portion, the projecting free end portions of the tabs being bent over against the base portion, as best shown in Fig. 3.

For their locking cooperation, the locking member 31 is provided with a peripheral notch or recess 39 and the striker or keeper flange portion 35 is provided with a projection 40 for seating engagement in said notch or recess. As here shown (see Fig. 2), the striker or keeper projection 40 is an integral part of the flange portion 35, the projection extending transversely thereof and being of wedge shape in cross section. For the procurement of a locking relationship in which but little vertical play or lost motion of the parts is permitted, the relative sizes of the striker or keeper projection 40 and the locking member notch or recess 39 are such that said projection snugly fits said notch or recess, as best shown in Fig. 2.

The provision of the flange portion 34 of the striker or keeper effectively prevents lateral separating movement of the locking member 31 relative to the striker or keeper projection 40 when such parts are in their locking relationship, and said flange portion 34 is also available for use as a guide for said locking member in its movement into and out of such locking relationship. As a further aid in the releasable maintenance of the locking relationship of the locking member 31 and the striker or keeper projection 40 when the deck lid or luggage compartment cover is in closing position relative to the luggage compartment opening 13, including the maintenance of such relationshion against the efforts of one seeking to break into the luggage compartment, the flange portion 34 of the striker or keeper may be provided, if desired, with a lateral extension which overlies, in whole or in part, the locking member 31 when said member is in its locking position, such as the lateral extension 42 shown in Figs. 2, 3 and 4.

To releasably retain in locking relationship the locking member notch or recess 39 and the striker or keeper projection 40 when the deck lid or luggage compartment cover A is in closed position, and to so position said notch or recess when the deck lid or luggage compartment cover is in raised or open position that such locking relationship will be automatically established upon the movement of said deck lid or luggage compartment cover downwardly into position, a disc-like member 44, for cooperative engagement with a hereinafter described detent lever 45, is rigidly mounted on the inner end of the stub shaft 30, on the outer end of which is rigidly mounted the locking member 31, as heretofore mentioned.

In the present embodiment of the invention, said disc-like member 44 is provided with two circumferentially spaced peripheral shoulders 46 and 47 for engagement with the lower end of the detent lever 45, the shoulder 46 being so located that it is engaged by said detent lever when the deck lid or luggage compartment cover A is in its lowered, closed position, as in Figs. 6 and 8, and the shoulder 47 being so located that it is engaged by said detent lever when the deck lid or luggage compartment cover is in its raised, open position, as in Fig. 9.

To automatically maintain the detent lever 45 in engagement with the disc-like member 44 on the inner end of the shaft 30, except when the lever is forcibly moved out of such engagement by the manually operable means hereinafter described, a spiral spring 48 is here coiled about the pin 49 by which said lever is pivotally mounted, intermediate its ends, on the casing or housing base member 21 for swinging movement within the casing or housing chamber. As best shown in Fig. 6, the inner end of said spiral spring is secured or anchored to said pivot pin and the outer and upwardly extending end of said spring has bearing engagement with a lug 50 with which the upper end portion of the detent lever 45 is here provided. Inasmuch as the outer, upwardly extending end of said spring, and hence the upper end of the detent lever engaged thereby, tend to move in a counterclockwise direction, Figs. 6, 8 and 9, the lower end of the detent lever is thus constantly urged into engagement with the disc-like member 44, as will be readily understood.

To limit rotary movement of the disc-like member 44, and hence rotary movement of the locking member 31, inasmuch as both members are rigidly mounted on opposite ends of the same shaft, the casing on housing base plate 21 is here provided with a struck up lug 52 which, as best shown in Fig. 8, cooperates with a projection 53 on member 44 to limit counterclockwise movement of said member. Preferably and as here shown, the casing or housing base plate 21 is also provided with a struck up lug 54 for engagement by the upper end portion of the detent lever 45 in limiting clockwise movement of said lever, with the result that the lower end of said lever also serves as a means for limiting clockwise movement of the member 44, inasmuch as the width of the shoulder 47 of said member is sufficiently great to prevent it from passing beyond said lever end in the clockwise movement of said member.

If desired and as here shown, a leaf spring 55 may be provided for engagement with the disc-like member 44 in the releasable retention of such member in either the position thereof shown in Figs. 6 and 8 or the position thereof shown in Fig. 9. In the present embodiment of the invention, the upper end of said spring 55 is secured to the casing or housing base plate 21 by means of two lugs 56 with which such base plate is provided, and the lower end of said spring is bent into semi-circular form, as at 57, for peripheral engagement with said disc-like member. To assist in the releasable retention of said member in the position thereof shown in Fig. 9, which is the provision of such member when the locking member 31 is in its non-locking position, said disc-like member 44 may be provided with a peripheral depression 58 to receive the semi-circular end 57 of the spring 55, as in Fig. 9.

As thus far described, it will be evident that when the deck lid or luggage compartment cover A is in its raised or open position, the locking member will be in the dot-dash line position shown in Figs. 2 and 9, a position in which it is releasably held by the engagement of the detent lever 45 with the shoulder 47 of the disc-like member 44. Upon downward movement of the deck lid or luggage compartment cover to closed position, the locking member 31 will be turned by its engagement with the striker or keeper projection 40 in a counterclockwise direction, Fig. 2, and thereby automatically brought into locking cooperation with such striker or keeper projection. When in such locking cooperation with said projection, the position of the locking member is that shown in full lines, Fig. 2, and in dot-dash lines, Fig. 8, a position in which the locking member is releasably held, for the releasable retention of the deck lid or luggage compartment cover A in closed position, by the engagement of the detent lever 45 with the shoulder 46 of the disc-like member 44.

When opening movement of the deck lid or luggage compartment cover A is desired, the detent lever 45 must be manually swung out of its detaining engagement with the shoulder 46 of the disc-like member 44, to thereby permit the locking member 31 to move out of its locking cooperation with the striker or keeper projection 40 as the deck lid or luggage compartment cover is manually raised to open position. Although the deck lid or luggage compartment cover may be provided with any suitable means by which it may be grasped for its manual movement into and out of closed position, said deck lid or luggage compartment cover is here provided with a simple handle 60, as shown in Fig. 1.

In this particular embodiment of the invention, the means for swinging the detent lever 45 out of detaining engagement with the shoulder 46 of the disc-like member 44, when opening movement of the deck lid or luggage compartment cover A is desired, includes a cup-shaped member 62, the annular side wall of which is provided with a depending L-shaped finger 63 for engagement with the upper end portion of the detent lever. As best shown in Figs. 6 and 7, the annular side wall of said cup-shaped member 62 is rotatably supported on an annular flange 64 of the casing or housing base plate 21 at the upper end thereof, the flange 64 surrounding an opening 65 through said base plate and such opening being in registry with an opening 66, of non-circular shape, such as square, in the circular end wall of the cup-shaped member 62 when said member is on its supporting flange 64.

Projecting through said openings 65 and 66 and more or less snugly fitting the latter opening, is the non-circular, such as square, inner end portion of a spindle 68, the outer end portion of which extends into a key tumbler casing 69, as shown in Fig. 1. By means of the key 70, Fig. 1, the spindle 68 can be turned about its longitudinal axis, in a counterclockwise direction, Fig. 6, with corresponding movement of the depending finger 63 of the cup-shaped member 62, to thereby swing the detent lever 45 from its detaining engagement with the shoulder 46 of the disc-like member 44. Upon the release of the member 44, the deck lid of luggage compartment A can be manually raised or opened, as will be readily understood.

Although in the embodiment of the invention as illustrated in Figs. 1 to 6 inclusive, the release of the disc-like member 44 is effected by counterclockwise movement (Fig. 6) of the key-actuated spindle 68 and the depending finger 63 of the cup-shaped member 62, release of such disc-like member can be effected, if desired, by clockwise movement of said spindle and said finger.

Such a modification is shown in Fig. 10, in which the upper end portion of the detent lever 45a is curved to the left, and in which the finger 63a of the cup-shaped member 62a is upwardly disposed for engagement with said detent lever end portion. With such disposition of the parts, the key-actuated spindle and the finger 63a movable therewith must be turned in a clockwise direction, Fig. 10, to move the detent lever out of detaining engagement with the disc-like member 44, as will be evident from Fig. 10 and as will be readily understood.

In the embodiment of Fig. 10, a lug 72, here shown as an integral part of the casing or housing base plate 21a, is provided to limit counterclockwise movement of the plunger actuated finger 63a, with a lug 54a also being provided on said casing or housing base plate to limit clockwise movement of the detent lever, as in the embodiment of the invention illustrated in Figs. 1 to 6 inclusive.

A further embodiment of the present invention is illustrated in Figs. 11 to 13 inclusive, and in this embodiment, the manually operable means for swinging the detent lever 45b from its detaining engagement with the shoulder 46b of the disc-like member 44b, when opening movement of the deck lid or luggage compartment cover AA is desired, includes a push button 74 suitably mounted on the outer wall 11b of said deck lid or luggage compartment cover, such as adjacent the handle 60b thereof.

As best shown in Figs. 12 and 13, the forwardly bent upper end portion 75 of the detent lever 45b is engaged by the pivoted lower end portion of a lever 76 arranged within the chamber of the lock casing or housing, the lower end portion of said lever 76 being pivoted at 77 to the casing or housing base plate 21b and the rearwardly bent upper end portion 78 of said lever being movable forwardly and rearwardly through a slot 79 in the upper end portion of said casing or housing base plate.

As will be evident from Figs. 12 and 13, when the upper end portion 78 of the lever 76 is moved forwardly, to its dot-dash line position, Fig. 13, the pivoted lower end portion of said lever, by its engagement with the upper end portion 75 of the detent lever 45b, will cause such detent lever to swing in a clockwise direction, Fig. 12, with the consequent release of the disc-like member 44b from its detention by said detent lever, and the consequent freedom of the deck lid or luggage compartment cover AA to be manually raised to open position.

To effect such forward movement of the upper end portion 78 of the lever 76, when opening movement of the deck lid or luggage compartment cover AA is desired, the push button 74 has operatively associated therewith a plunger 81 slidably and rotatably mounted in a key tumbler casing 82 carried by the outer wall 11b of the deck lid or luggage compartment cover and located between such wall and the inner wall 10b of the deck lid or luggage compartment cover. As best shown in Figs. 11 and 13, the inner end portion of the plunger 81 projects beyond the inner end of the key tumbler casing 82 and terminates in a laterally bent end part 83, which, by manual operation of a key 85, Fig. 11, can be turned either upwardly, as in Fig. 13, or downwardly, as in Fig. 11.

When this laterally bent plunger end part 83 is in its upturned position, as in Fig. 13, it is in alignment or registry with the rearwardly extending upper end portion 78 of the lever 76, with the result that upon manual depression or forward movement of the push button 74, the detent lever 45b is swung out of detaining engagement with the disc-like member 45b because of the forward movement of the plunger and of the upper end portion 78 of the lever 76. However, when it is desired to lock the deck lid or luggage compartment cover AA against opening movement, the laterally bent rear end part 83 of the plunger 81 is turned downwardly, as in Fig. 11, so that it no longer is in alignment or registry with the rearwardly extending upper end portion 78 of the lever 76, and thus is ineffective to operate such lever. Therefore, although the push button 74 can be depressed as before, and although such push button movement effects forward movement of the plunger 81 and its laterally bent rear end part 83, release of the disc-like member 44b cannot be effected, as will be readily understood.

To those skilled in the art to which the present invention relates, further features and advantages of locks embodying the invention, and other embodiments than those here illustrated and described, will be readily apparent.

What we claim is:

1. In locking mechanism for releasably retaining a closure structure in closed position relative to an adjacent structure, a plate-like member having an upper portion adapted to be secured to one of said structures and having a lower portion disposed at a substantial angle to said upper portion, a shaft journalled in the lower portion of said plate-like member and extending transversely thereof, a locking member of disc-like form rigidly mounted on one end of said shaft for locking cooperation with keeper means adapted to be secured to the other of said structures, a member having a shoulder, said shouldered member being rigidly mounted on the other end of said shaft, a detent member movably mounted on said plate-like member for detaining engagement with the shoulder of said shouldered member, said detent member having an upper portion extending alongside the upper portion of said plate-like member, resilient means for normally maintaining said detent member in engagement with said shouldered member, and manually operable means cooperable with the upper portion of said detent member for moving said detent member out of engagement with the shoulder of said shouldered member.

2. In locking mechanism for releasably retaining a closure structure in closed portion relative to an adjacent structure, a chambered casing having a base member and a cover member, one of said members being provided with peripheral flange means to substantially close the casing chamber, the casing having an upper portion adapted to be secured to one of said structures and having a lower portion disposed at a substantial angle to said upper portion, a shaft journalled in the lower portion of the base member of said casing and extending transversely of such portion of said base member, a locking member of disc-like form rigidly mounted on one end of said shaft for locking cooperation with keeper means adapted to be secured to the other of said structures, a member having a shoulder, said shouldered member being rigidly mounted on the other end of said shaft and being located in the chamber of said casing, a detent member movably mounted on the base member of the casing for detaining engagement with the shoulder of said shouldered member, said detent member being located in the chamber of the casing and having an upper portion disposed alongside the upper portion of said casing base member, resilient means located in the casing chamber for normally maintaining said detent member in engagement with said shouldered member, and manually operable means cooperable with the upper portion of said detent member for moving said detent member out of engagement with the shoulder of said shouldered member.

3. Locking mechanism as set forth in claim 2, characterized in that said manually operable means includes an actuating member for said detent member pivotally mounted on said base member and within the chamber of the casing, and in that said manually operable means also includes a key-operated spindle for effecting pivotal movement of said actuating member, said spindle being rotatable about its longitudinal axis and having one of its end portions disposed in an opening with which such actuating member is provided to thereby provide a driving relationship between such spindle and said actuating member.

References Cited in the file of this patent
UNITED STATES PATENTS

| | | |
|---|---|---|
| 13,722 | Holmes et al. | Oct. 30, 1855 |
| 1,316,595 | Rehdorf | Sept. 23, 1919 |
| 1,789,775 | Russ et al. | Jan. 30, 1931 |
| 2,156,874 | Schonitzer | May 2, 1939 |
| 2,218,183 | Springer | Oct. 15, 1940 |
| 2,322,892 | Springer | June 29, 1943 |
| 2,475,951 | Floraday | July 12, 1949 |
| 2,582,926 | Dall | Jan. 15, 1952 |
| 2,603,963 | Allen | July 22, 1952 |
| 2,606,783 | Roethel | Aug. 12, 1952 |
| 2,608,428 | Allen | Aug. 26, 1952 |
| 2,629,621 | Roethel | Feb. 24, 1953 |
| 2,631,880 | Vigmostad | Mar. 17, 1953 |